US010968296B2

(12) United States Patent
Alsbaiee et al.

(10) Patent No.: US 10,968,296 B2
(45) Date of Patent: Apr. 6, 2021

(54) AIR VOID CONTROL COMPOSITION FOR CARBONYL-CONTAINING MONOMER POLYMERIZATION

(71) Applicant: Arkema France, Colombes (FR)

(72) Inventors: Alaaeddin Alsbaiee, King of Prussia, PA (US); Evan Crocker, Downingtown, PA (US); Dana Lee Swan, Spring City, PA (US)

(73) Assignee: Arkema France, Colombes (FR)

( * ) Notice: Subject to any disclaimer, the term of this patent is extended or adjusted under 35 U.S.C. 154(b) by 6 days.

(21) Appl. No.: 16/468,002

(22) PCT Filed: Dec. 13, 2017

(86) PCT No.: PCT/US2017/066059
§ 371 (c)(1),
(2) Date: Jun. 10, 2019

(87) PCT Pub. No.: WO2018/112020
PCT Pub. Date: Jun. 21, 2018

(65) Prior Publication Data
US 2019/0389986 A1  Dec. 26, 2019

Related U.S. Application Data

(60) Provisional application No. 62/434,022, filed on Dec. 14, 2016.

(51) Int. Cl.
*C08F 120/14* (2006.01)
*C08K 5/17* (2006.01)
*C08J 5/10* (2006.01)

(52) U.S. Cl.
CPC .............. *C08F 120/14* (2013.01); *C08J 5/10* (2013.01); *C08K 5/17* (2013.01); *C08J 2333/12* (2013.01); *C08K 2201/014* (2013.01)

(58) Field of Classification Search
CPC ... C08F 120/14; C08K 5/17; C08K 2201/014; C08J 5/10; C08J 2333/12
See application file for complete search history.

(56) References Cited

U.S. PATENT DOCUMENTS

| | | |
|---|---|---|
| 3,234,194 A | 2/1966 | Slocum |
| 3,565,822 A | 2/1971 | Bodycot |
| 3,759,881 A | 9/1973 | Holder |
| 4,219,626 A * | 8/1980 | Wolfers ............ C08F 299/0457 525/23 |
| 4,717,756 A | 1/1988 | Kato et al. |
| 5,902,839 A | 5/1999 | Lautenschlager et al. |
| 2008/0207841 A1 | 8/2008 | Koers et al. |
| 2010/0048824 A1 | 2/2010 | Jansen et al. |
| 2013/0123452 A1 | 5/2013 | Hage et al. |
| 2013/0211013 A1 | 8/2013 | Koers et al. |
| 2014/0005342 A1 | 1/2014 | Reijnders et al. |
| 2014/0005343 A1 | 1/2014 | Koers |
| 2014/0011966 A1 | 1/2014 | Reijnders et al. |
| 2014/0053976 A1 | 2/2014 | Valloir et al. |
| 2015/0120977 A1 | 4/2015 | Hunsaker et al. |
| 2017/0362442 A1 | 12/2017 | Gerard et al. |

OTHER PUBLICATIONS

Cook et.al.: "Photopolymerization kinetics of dimethacrylates using the camphorquinone/amine initiator system", Polymer, vol. 33, No. 3, Jan. 1992, pp. 600-609.
Xin-De Feng: "The role of amine in vinyl radical polymerization", Macromolecular Symposia, vol. 63, No. 1, pp. 1-18.

* cited by examiner

*Primary Examiner* — Robert D Harlan
(74) *Attorney, Agent, or Firm* — Thomas F. Roland

(57) ABSTRACT

The invention relates to the use of low levels of aliphatic primary and secondary amines to control air void formation in any polymerization reaction having carbonyl groups, and especially carboxylic acid ester group-containing monomers at a level of at least 10% of total monomer, where the monomer has a peak polymerization exotherm temperature of greater than the boiling point of the monomer. The primary or secondary amines are used in the polymerization mixture at levels of 100 to 5000 ppm, based on the carboxylic acid ester group-containing monomer. It is believed the primary and secondary amines hydrogen bond with the —C=O)O— containing monomer to increase the monomer boiling point, and decrease or even eliminate the formation of air voids due to monomer boiling. The invention is especially useful in polymerization of methymethacrylate polymers and copolymers, either neat, or as a polymer composite system.

5 Claims, 2 Drawing Sheets

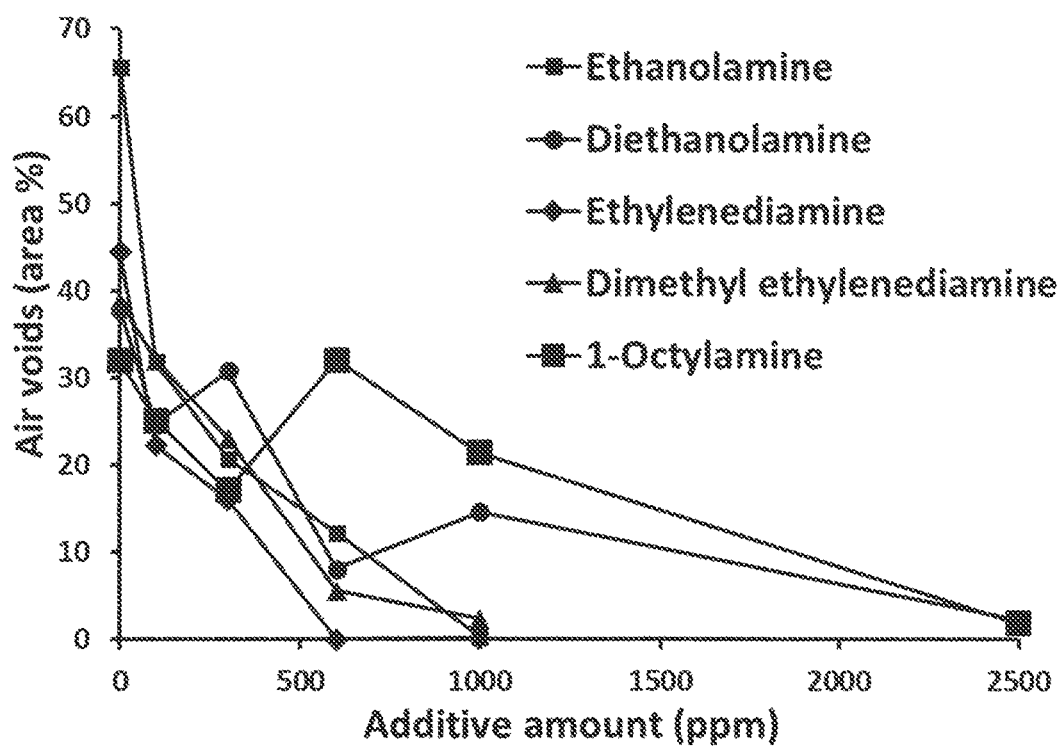

AIR VOID CONTROL COMPOSITION FOR CARBONYL-CONTAINING MONOMER POLYMERIZATION

This application claims benefit, under U.S.C. § 119 or § 365 of PCT Application Number PCT/US2017/066059, filed Dec. 13, 2017; and U.S. Provisional Application No. 62/434,022, filed Dec. 14, 2016; said applications incorporated herein by reference.

FIELD OF THE INVENTION

The invention relates to the use of low levels of aliphatic primary and secondary amines to control air void formation in any polymerization reaction having carbonyl groups, and especially carboxylic acid ester group-containing monomers at a level of at least 10% of total monomer, where the monomer has a peak polymerization exotherm temperature of greater than the boiling point of the monomer. The primary or secondary amines are used in the polymerization mixture at levels of 100 to 5000 ppm, based on the carboxylic acid ester group-containing monomer. It is believed the primary and secondary amines hydrogen bond with the —C=O)O— containing monomer to increase the monomer boiling point, and decrease or even eliminate the formation of air voids due to monomer boiling. The invention is especially useful in polymerization of methacrylate polymers and copolymers, either neat, or as a polymer composite system.

BACKGROUND OF THE INVENTION

The polymerization of carbonyl-containing vinyl monomers is an exothermic reaction. If the temperature of the reaction mixture exceeds the boiling point of the monomer(s), the monomer boils, resulting in undesirable bubble formation. In a viscous polymer system, the trapped bubbles remain in the solidified polymer product after polymerization as air voids. These air voids are defects that influence the mechanical properties of the cured polymer and compromise its long-term stability and aesthetics. This problem becomes more severe as the final articles become thicker, where heat transfer is more limited and the exotherm temperature gets higher. For a methyl methacrylate monomer system, exotherm temperature higher than 100° C. cause the formation of air voids.

Traditional methods for controlling the polymerization exotherm of carbonyl-containing monomer, such as PMMA and PMMA composites, involve conducting the polymerization in a mold surrounded by a cooling bath. Other strategies involve chemical methods such as the use of inhibitors and chain transfer agents. Although these chemical strategies can successfully reduce the exotherm temperature and lower air void formation, they interfere with the chemistry of polymerization by trapping the polymer radicals, which increases the cure time and reduce the molecular weight of the resulting polymer, causing a negative effect on polymer mechanical properties. There is a need for better strategies to mitigate the effect of the polymerization exotherm and lower or even eliminate air void formation in the cured polymer, while causing minimal or no impact on the cure kinetics and molecular weight of polymer. One system that is especially in need of such strategies is the polymerization of methyl methacrylate (MMA) into polymethyl methacrylate (PMMA) and its copolymer.

Surprisingly it has been found that the addition of very low levels of one or more aliphatic primary and secondary amines in a MMA liquid resin system will reduce and even eliminate air void formation in the polymerized PMMA. The same effect is expected in any bulk polymerization involving carbonyl-containing monomers. While not being bound by any particular theory, it is believed that the addition of low levels of primary or secondary aliphatic amines, in which the amino groups act as hydrogen bonds donor, increases the boiling point of MMA, likely by forming hydrogen bonds with the MMA monomer. By increasing the boiling point of MMA above the temperature of the exotherm, air void formation can be eliminated. Depending on the chemical structure of the aliphatic amine, the low level of the additive in the composition either has little or no effect on the cure kinetics and molecular weight of the PMMA product.

While the application will focus on (meth)acrylic monomers, and in particular on polymers containing greater than 51 weight percent of methyl methacrylate, the principles and technical solution described would be expected to work efficiently in any polymerization involving at least 10% of carbonyl-containing monomers. The same mechanism achieving the same technical effect of controlling or eliminating air voids would be expected.

SUMMARY OF THE INVENTION

The invention relates to a polymerization reaction mixture comprising:
a) 200 to 5000 ppm, preferably 300 to 4000 ppm, more preferably 400 to 3000 ppm, and most preferably from 600 to 2500 ppm, of one or more aliphatic primary or secondary amines, said percentage based on the weight of monomer; and
b) a monomer composition, wherein said monomer composition comprises least 10 weight percent, more preferably at least 25 weight percent, more preferably 40 weight percent, more preferably at least 51 weight percent, more preferably at least 70 weight percent, more preferably at least 80 weight percent, and more preferably at least 90 weight percent of carbonyl-group-containing monomer.

The invention further relates to a thermoplastic article comprising:
a) a (meth)acrylic polymer matrix, and
b) from 100 to 5000 ppm of aliphatic amine, based on the weight of the polymer,
wherein said article contains air voids less than 10 volume percent, preferably less than 5 volume percent, more preferably less than 1 volume percent, and most preferably less than 0.1 volume percent.

The invention further relates to a process for producing a low defect poly(meth)acrylate article comprising the step of adding to a reaction mixture, from 200 to 5000 ppm, preferably 300 to 4000 ppm, more preferably 400 to 3000 ppm, and most preferably from 600 to 2500 ppm, of one or more primary or secondary aliphatic amines.

BRIEF DESCRIPTION OF THE DRAWINGS

FIG. 3: Is a plot showing the air void level for different amines at different loading levels.

DETAILED DESCRIPTION OF THE INVENTION

Figure 1:
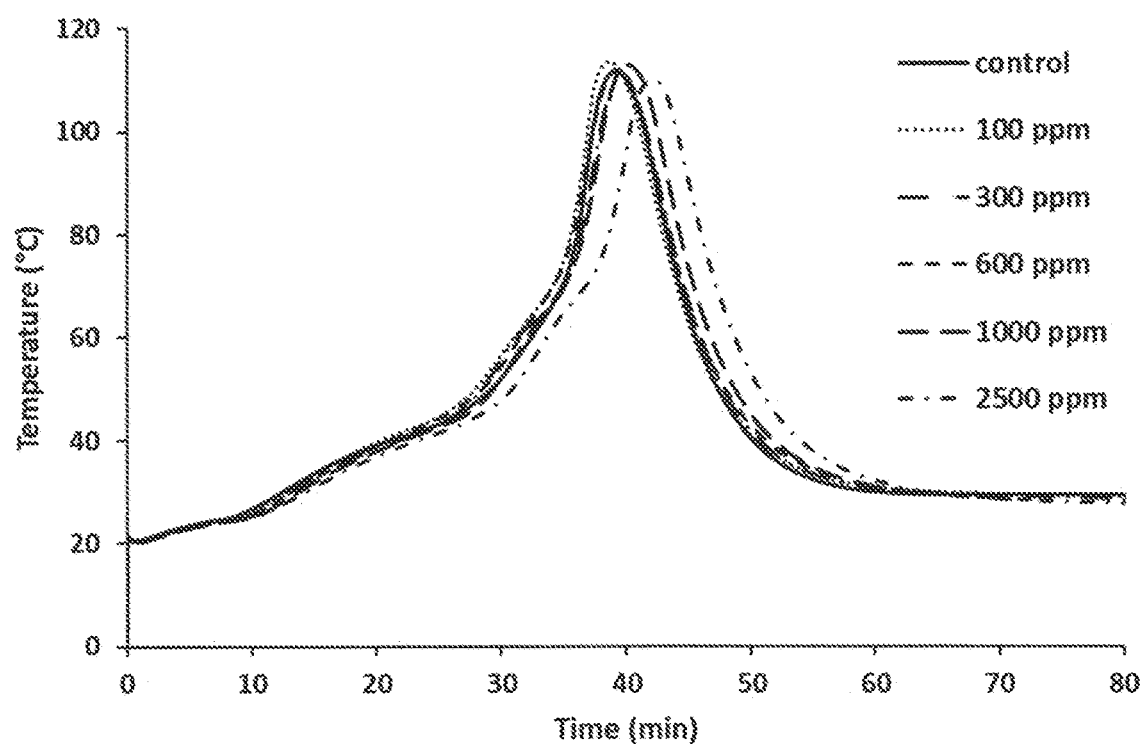
FIG. 1: Is a plot showing the effect of variable amounts of diethanolamine on exotherm plots.

All references listed in this application are incorporated herein by reference. All percentages in a composition are weight percent, unless otherwise indicated, and all molecular weights are given as weight average molecular weight determined by Gel Permeation Chromatography (GPC) using a polystyrene standard, unless stated otherwise. Combinations of different elements described herein are also considered as part of the invention.

By the term "polymerization" as used herein denotes the process of converting a monomer or a mixture of monomers into a polymer.

By the term "thermoplastic polymer" as used herein denotes a polymer that turns to a liquid or becomes more liquid or less viscous when heated and that can take on new shapes by the application of heat and pressure.

By the term "thermosetting polymer" as used herein denotes a prepolymer in a soft, solid or viscous state that changes irreversibly into an infusible, insoluble polymer network by curing.

By the term "polymer composite" as used herein denotes a multicomponent material comprising multiple different phase domains in which at least one type of phase domain is a continuous phase and in which at least one component is a polymer.

By the term "initiator" as used herein denotes a chemical species that reacts with a monomer to form an intermediate compound capable of linking successively with a large number of other monomers into a polymeric compound.

The term "copolymer" as used herein denotes a polymer formed from two or more different monomer units. The copolymer may be random, block, or tapered, and can be straight chain, branched or have any other configuration, such as, but not limited to star polymers, comb polymers and core-shell copolymers.

The present invention relates to the use of low levels of primary and secondary aliphatic amines to reduce and even eliminate air voids in articles formed from carbonyl-containing monomers, including neat polymers and composites.

Carbonyl Containing Monomers

The invention solves the technical problem of reducing or eliminating air void formation in a polymer formed from a monomer composition having at least 10 weight percent, more preferably at least 25 weight percent, more preferably 40 weight percent, more preferably at least 51 weight percent, more preferably at least 70 weight percent, more preferably at least 80 weight percent, and more preferably at least 90 weight percent of carbonyl-group-containing monomer. A homopolymer or copolymer formed from 100 weight percent carbonyl-group-containing monomer, and especially 100 weight percent of one or more (meth)acrylic monomers is a preferred embodiment of the invention. The invention will be described in terms of (meth)acrylic monomers, however one of ordinary skill in the art will recognize that the same technical solution can be applied to any monomer system in which amines can effectively hydrogen bond to the monomer units.

(Meth) acrylic monomers useful in the invention include, but are not limited to, methyl methacrylate, methyl acrylate, ethyl acrylate and ethyl methacrylate, butyl acrylate and butyl methacrylate, iso-octyl methacrylate and iso-octyl acrylate, lauryl acrylate and lauryl methacrylate, stearyl acrylate and stearyl methacrylate, isobornyl acrylate and isobornyl methacrylate, methoxy ethyl acrylate and methoxy methacrylate, 2-ethoxy ethyl acrylate and 2-ethoxy ethyl methacrylate, and dimethylamino ethyl acrylate and dimethylamino ethyl methacrylate monomers. (Meth) acrylic acids such as methacrylic acid and acrylic acid can be useful for the monomer composition.

From 0 to 90 weight percent, and preferably less than 50 weight percent, more preferably less than 20 weight percent of non-carbonyl-containing monomers may also be present. Useful non-carbonyl-containing monomers include, but are not limited to styrene, alpha methyl styrene, acrylonitrile, and crosslinkers at low levels may also be present in the monomer mixture.

The term "PMMA" as used herein, means homopolymers and copolymers having two or more different monomer units containing at least 50 weight percent of methyl methacrylate monomer units. Most preferably the PMMA polymer is a homopolymer or a copolymer having 70-99.9 weight percent and more preferably 80 to 99 percent of methyl methacrylate units and from 0.1 to 30 weight percent of one or more $C_{1-8}$ straight or branched alkyl acrylate units. Preferably, any comonomer should have a boiling point near or above the polymerization exotherm temperature.

In the description below, PMMA is used as a model polymer system to describe the principles of the present invention. One of ordinary skill in the art can apply these same principles to other polymer systems containing at least 10 weight percent of carbonyl-containing monomer(s).

PMMA polymerization of the invention is generally a semi-bulk process, normally performed by first a partial polymerization to form a syrup containing unreacted monomer, oligomer and polymer. Additional initiator is added to the syrup, which is then placed into a mold or cast into sheets, where final polymerization into a solid polymer article occurs.

Alternatively, a bulk process can also be used, where all monomer, initiator and other additives are placed into the initial charge, and the reaction started until full polymerization occurs. The weight-average molecular mass of the PMMA polymer should be high, meaning more than 50,000 g/mol, preferably more than 80,000 g/mol, and preferably more than 100,000 g/mol. The molecular weight may be up to 2,000,000 g/mol, and preferably less than 300,000 g/mol.

Another preferred embodiment involves dissolving PMMA polymer in monomer composition—which is largely or completely composed of MMA. This polymer/monomer mixture provides viscosity control of the viscous syrup solution. This PMMA syrup is then combined with additional initiator, and placed into a mold (that could contain oriented fibers of a fiber mat for a reinforced composite), or impregnated into long fibers, where final polymerization occurs, producing a final thermoplastic article.

According to another embodiment, the PMMA is a mixture of at least one homopolymer and at least one copolymer of MMA, or a mixture of at least two homopolymers or two copolymers of MMA with a different average molecular weight, or a mixture of at least two copolymers of MMA with a different monomer composition.

The polymer formed by the polymerization using the composition of this invention may be either a thermoplastic or a thermoset polymer.

Aliphatic Amines

Low levels of one or more aliphatic primary or secondary amines can be added to the PMMA polymerization mixture acting as hydrogen bond donors that can increase the boiling point of methyl methacrylate (MMA) monomer. By raising the MMA boiling point above the reaction temperature created by the polymerization exotherm, air void formation in the PMMA syrup can be reduced and even eliminated. The aliphatic amines should be compatible with methacrylic monomer.

Preferably the aliphatic amines are used at very low levels, and have little or no negative affect on the reaction kinetics or molecular weight. The hydrogen bond donor is used at a level of from 100 to 5000 ppm, preferably 200 to 5000 ppm, preferably 300 to 4000 ppm, more preferably 400 to 3000 ppm, and most preferably from 600 to 2500 ppm, of one or more aliphatic amines, said percentage based on the weight of MMA monomer.

Aliphatic primary and secondary amines, are especially useful as hydrogen bond donors in the invention due to their low cost and minimal environmental impact. Secondary amines are more preferred than primary amines since the former has less influence on cure kinetics than the later. Tertiary amines are not useful in reducing and even eliminating aid void formation because they lack N—H hydrogen bond donor groups.

All primary amines and secondary amines are useful in reducing or eliminating air voids. Some useful primary amines include, but are not limited to: Primary amines having linear and branched aliphatic alkyl groups of C4, C5, C6, C7, C8, C9, C10, C11, C12, C13, C14, C15, C16, C17, C18, C19, C20, including but not limited to: 1-butylamine. 2-butylamine, 1-, 2-, and 3-pentylamine. 1-, 2-, and 3-hexylamine. 1-, 2-, 3-, and 4-heptylamine. 1-, 2-, 3-, and 4-octylamine. Aromatic primary amines including mono-, di-, tri-, tetra-, and penta-substituted aromatic amines, including but not limited to: aniline. o-, m-, and p-toluidine. Aliphatic primary diamines such as 1,2-, 1,3-, 1,4- and 1,5-diamines with linear and branched aliphatic alkyl groups of C2, C3, C4, C5, C6, C7, C8, C9, C10, C11, C12, C13, C14, C15, C16, C17, C18, C19, C20, including but not limited to: ethylenediamine. 1,2- and 1,3-propylenediamine. 1-2, 1-3, and 1,4-butylenediamine. 1,2-, 1,3-, 1,4- and 1,5-pentylenediamine. Aromatic primary diamines including ortho-, meta-, and para-aromatic diamines of di-, tri-, tetra-, and penta-substituted aromatic diamines, such as, but not limited to: o-phenylenediamine. m-phenylenediamine. p-pheylenediamine. Primary hydroxyl amines, including but not limited to, ethanolamine. propanolamine.

Useful aliphatic secondary amines include, but are not limited to those having linear and branched aliphatic alkyl groups of C4, C5, C6, C7, C8, C9, C10, C11, C12, C13, C14, C15, C16, C17, C18, C19, C20, including but not limited to: N,N-diethylamine. N,N-dibutylamine. N,N-ethyl isopropylamine. Aromatic secondary amines, having mono-, di-, tri-, tetra-, and penta-substituted aromatic secondary amines, including but not limited to: N-ethyl-N-phenylamine. N-ethyl-N-(4-methylphenyl) amine. Aliphatic secondary diamines having 1,2-3-, 1,4- and 1,5-secondary diamines with linear and branched aliphatic alkyl groups of C4, C5, C6, C7, C8, C9, C10, C11, C12, C13, C14, C15, C16, C17, C18, C19, C20, including but not limited to: N,N-dimethyl ethylenediamine. N,N-dimethyl propylenediamine. And secondary hydroxyl amines, including but not limited to: diethanolamine.

Some aliphatic primary amines, such as 1-octyl amine, ethanol amine and ethylenediamine, completely eliminate air voids at the use level, but they may increase the cure time of the PMMA syrup by up to 50%.

The most preferred aliphatic secondary amine is diethanolamine, which can completely eliminate void formation at levels of from 1000-2500 ppm, and has almost no effect on cure time.

The amine can be added to the reaction mixture any time prior to the development of the peak polymerization exotherm, since it is stable and has little or no effect on the polymerization kinetics. When the reaction mixture has a low viscosity (early in the polymerization) any air void formed has a high probability of escaping the low viscosity, low polymer content reaction mixture. More air void formation occurs when the polymerization mixture develops a higher viscosity, which results in more air void entrapment. Generally, the e can be added at or near the beginning of the bulk polymerization, or prior to initiation of a prepolymer syrup in a two-stage polymerization.

Other Additives:

Other additives typically used in acrylic polymers may be added to the reaction mixture, including impact modifiers, and other additives typically present in polymer formulations, including but not limited to, stabilizers, plasticizers, fillers, coloring agents, pigments, dyes, antioxidants, antistatic agents, surfactants, toner, refractive index matching additives, additives with specific light diffraction, light absorbing, or light reflection characteristics, flame retardants, density reducers, surface leveling agents and dispersing aids, low profile additives (acrylics, poly vinyl acetate), acrylic beads, low molecular weight acrylic process aids such as low molecular weight (less than 100,000, preferably less than 75,000 and more preferably less than 60,000 molecular weight), and low viscosity or low Tg acrylic resins (Tg<50° C.).

If the polymer, such as PMMA is formed from a polymer syrup having monomer and dissolved polymer and/or oligomer, in addition to initiator it may optionally contain inhibitors, activator, and chain transfer agents.

An inhibitor is optionally present to prevent the monomer from spontaneously polymerizing. The (meth)acrylic monomer is typically one or more monomers as defined above with, optionally, a suitable inhibitor such as hydroquinone (HQ), methyl hydroquinone (MEHQ), 2,6-di-tertiary-butyl-4-methoxyphenol (TOPANOL O) and 2,4-dimethyl-6-tertiary-butyl phenol (TOPANOL A).

The liquid (meth) acrylic syrup optionally comprises an activator for the polymerization.

A polymerization activator or accelerator is chosen from tertiary amines such as N,N-dimethyl-p-toluidine (DMPT), N,N-dihydroxyethyl-p-toluidine (DHEPT), Bisomer PTE, organic-soluble transition metal catalysts or mixtures thereof.

If present, the content of the activator with respect to the to the (meth)acrylic monomer of the liquid (meth) acrylic syrup is from 100 ppm to 10000 ppm (by weight), preferably from 200 ppm to 7000 ppm by weight and advantageously from 300 ppm to 4000 ppm.

The presence of activators or accelerators depends upon the final application. Where "cold-cure" is necessary or wished, an accelerator is usually necessary. Cold cure means that the polymerization takes place at ambient temperature, meaning less than 50° C. or preferably less than 40° C.

An initiator is added to the PMMA syrup just before the syrup is added into a mold. The initiator is preferably one that has a half-life below 100° C. that is sufficient to drive the polymerization. Preferably the initiator is a radical initiator from the class of diacyl peroxides, peroxy esters, dialkyl peroxides, peroxyacetals or azo compounds.

The initiator or initiating system for starting the polymerization the (meth) acrylic monomer is preferably chosen from isopropyl carbonate, benzoyl peroxide, lauroyl peroxide, caproyl peroxide, dicumyl peroxide, tert-butyl perbenzoate, tert-butyl per(2-ethylhexanoate), cumyl hydroperoxide, 1,1-di(tert-butylperoxy)-3,3,5-trimethylcyclohexane, tert-butyl peroxyisobutyrate, tert-butyl peracetate, tert-butyl perpivalate, amyl perpivalate, tert-butyl peroctoate, azobisisobutyronitrile (AIBN), azobisisobutyramide, 2,2'-azobis (2,4-dimethylvaleronitrile) or 4,4'-azobis(4-cyanopentanoic). It would not be departing from the scope of the invention to use a mixture of radical initiators chosen from the above list.

Preferably the initiator or initiating system for starting the polymerization of the (meth) acrylic monomer is chosen from peroxides having 2 to 20 carbon atoms.

The content of radical initiator with respect to the (meth) acrylic monomer of the liquid (meth) acrylic syrup is from 100 to 50000 ppm by weight (50000 ppm=5 wt %), preferably between 200 and 40000 ppm by weight and advantageously between 300 and 30000 ppm. The initiator is added to the syrup just prior to production.

Another ingredient in the liquid resin can also be a chain-limiting agent in order to control the molecular weight, for example γ-terpinene, terpinolene, and 1,4-cyclohexadiene, at contents of between 0 and 5000 ppm and preferably between 0 and 1000 ppm, with respect to the monomers of the mixture.

In one preferred embodiment, one or more additional means of controlling the exotherm, or the effect of the exotherm are further added—providing a synergy that allows for lower use levels of each additive. This allows one of ordinary skill in the art to combine two or more additives based on the chemistry (homopolymer, copolymer composition), the molecular weight requirements, and the thickness and end-use of the final article.

In addition to aliphatic amines, other additives for synergistically controlling the effect of the polymerization exotherm include low levels of 1-5 weight percent of diols (including glycols) based on the weight of carbonyl-containing monomer, which also effectively raise the boiling point of MMA. Aliphatic short chain fatty esters can aid in heat dissipation, which dissipates the generated heat, and reduces monomer boiling when used at levels of from 0.6 to 6 weight percent based on the weight of carbonyl-containing monomer. Low amount of chain transfer agents of from 50 ppm to 5000 ppm can also be added to further reduce the amount of generated heat. One of ordinary skill in the art, based on the information in this patent application and others filed by Applicant, as well as the Examples, can easily mix and match different means of increasing the MMA boiling point, exotherm control, and heat dissipation, to arrive at an optimum formulation for each individual situation.

Process

In one embodiment of the invention, a PMMA syrup is used to form a PMMA polymer or polymer composite. The MMA syrup is composed of monomer in which polymer and/or oligomer is dissolved, is formed by either a partial polymerization of monomers, or by dissolving polymer and/or oligomer into the acrylic monomers.

In one preferred embodiment, a PMMA syrup consisting of PMMA monomer and PMMA polymer combined with fibers to form a thermoplastic composite. Preferably, the monomer/polymer acrylic syrup in the composite-forming syrup contains less than 10 weight percent, preferably less than 5 weight percent, more preferably less than 1 weight percent, and most preferably is free of oligomer. By oligomer, as used herein is meant a degree of polymerization of between 2 and 25 monomer units.

The PMMA polymer is fully soluble in the (meth)acrylic monomer or in the mixture of (meth)acrylic monomers. It enables the viscosity of the (meth)acrylic monomer or the mixture of (meth)acrylic monomers to be increased. The solution obtained is generally called a "syrup" or "prepolymer". The dynamic viscosity value of the liquid (meth) acrylic syrup is between 10 mPa·s and 10 000 mPa·s, preferably between 50 mPa·s and 5000 mPa·s and advantageously between 100 mPa·s and 1000 mPa·s. The viscosity of the syrup can be readily measured with a rheometer or a viscometer. The dynamic viscosity is measured at 25° C. The liquid (meth)acrylic syrup has Newtonian behavior, meaning that there is no Shear-thinning, so that the dynamic viscosity is independent of the shear in a rheometer or of the speed of the spindle in a viscometer. Such a viscosity of the syrup obtained allows correct impregnation of the fibers of the fibrous substrate.

Advantageously, the liquid (meth)acrylic syrup contains no additional voluntarily added solvent.

The PMMA syrup can become fully polymerized into a solid polymer by placing the syrup into a mold, adding initiator, and adding heat to begin further polymerization. The mold could be an open mold or a closed mold, and may be a thin flat mold, such as for making PMMA sheet (such as PLEXIGLAS® acrylic sheet), or may be placed into a mold having the shape of the desired final part.

In a preferred embodiment, the PMMA syrup is infused into a mold via vacuum infusion and left to cure at room temperature for a certain amount of time, depending on the target application.

In one embodiment, the mold may contain a grid of fiber reinforcement that becomes embedded in, and reinforces the PMMA article.

In another embodiment, fibers can be impregnated with the PMMA syrup, and then wound onto a mold then polymerized to form a hollow fiber-reinforced article. The composition of the invention reduces or eliminates air void formation during the exothermic polymerization.

Uses:

The reduction and even elimination of air void defects in a PMMA article results in an improvement in mechanical properties, long term stability, transparency, and appearance. The PMMA articles made using the aliphatic primary and secondary amines of the invention range from cast sheet, to large PMMA fiber composites in wind blades. Other articles that can be made using the composition of the invention include, but are not limited to, automotive parts, building and construction components, medical applications, sporting goods.

Aliphatic primary and secondary amines can be used to reduce or eliminate air voids in any (meth)acrylic thermoplastic or thermoset resin in which the exothermic temperature is higher than the boiling point of the constituent (meth)acrylic monomer in the composition.

The level of air voids in the final product of the invention are less than 10 volume percent, preferably less than 5 volume percent, more preferably less than 1 volume percent, and most preferably less than 0.1 volume percent.

One preferred use is in the formation of a fiber-reinforced thermoplastic composite, which is an alternative to thermoset resins, such as epoxies. The thermoplastic composite, available under the tradename ELIUM® from Arkema, can be combined with fiber reinforcement by several means, including but not limited to impregnation of the fibers followed by fiber-winding and curing, pultrusion of a fiber/ELIUM® syrup followed by curing, and the addition of ELIUM® syrup to an open or closed mold, following by curing. The curing could occur at elevated temperatures, or with the proper initiator, can occur at room temperature.

With regard to the fibrous substrate, one can mention fabrics, felts or nonwovens that may be in the form of strips, laps, braids, locks or pieces. The fibrous material care have different forms and dimensions either one dimensional, two dimensional or three dimensional. A fibrous substrate comprises an assembly of one or more fibres. When the fibres are continuous, their assembly forms fabrics. Chopped fibers could also be used to provide reinforcement in a polymer composite.

The one dimensional form is linear long fibers. The fibers may be discontinuous or continuous. The fibers may be arranged randomly or as a continuous filament parallel to each other. A fiber is defined by its aspect ratio, which is the ratio between length and diameter of the fiber. The fibers used in the present invention are long fibers or continuous fibers. The fibers have an aspect ratio of at least 1000, preferably at least 1500, more preferably at least 2000, advantageously at least 3000 and most advantageously at least 5000.

The two dimensional fibers could be fibrous mats or non-woven reinforcements or woven roving or bundles of fibers, which can also be braided.

The fibrous substrate of the present invention is chosen from vegetable fibres, wood fibres, animal fibres, mineral fibres, synthetic polymeric fibers, glass fibers, carbon fibers or mixtures thereof.

Natural fibers are for example sisal, jute, hemp, flax, cotton, coconut fibers, and banana fibers. Animal fibers are for example wool or hair. As synthetic material one can mention polymeric fibers chosen from fibers of thermosetting polymers, from thermoplastic polymers or their mixtures. The polymeric fibers can be made of polyamide (aliphatic or aromatic), polyester, polyvinylalcohol, polyolefins, polyurethanes, polyvinylchloride, polyethylene, unsaturated polyesters, epoxy resins and vinylesters.

The mineral fibers can also be chosen from glass fibers especially of type E, R or S2, carbon fibers, boron fibers or silica fibers.

The level of fiber in the fiber reinforced composite articles is from 20 to 90 weight percent, preferably from 40 to 80 weight percent, and most preferably from 60 to 70 weight percent.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:
1. A polymerization reaction mixture comprising:
   a) 100 to 5000 ppm, preferably 300 to 4000 ppm, more preferably 400 to 3000 ppm, and most preferably from 600 to 2500 ppm, of one or more aliphatic primary or secondary amities, said percentage based on the weight of monomer; and
   b) a monomer composition, wherein said monomer composition comprises least 10 weight percent, more preferably at least 25 weight percent, more preferably 40 weight percent, more preferably at least 51 weight percent, more preferably at least 70 weight percent, more preferably at least 80 weight percent, and more preferably at least 90 weight percent of carbonyl-group-containing monomer.
2. The polymerization reaction mixture of aspect 1, wherein said monomer composition comprises at least 90 weight percent, preferably at least 95 weight percent, of one or more (meth)acrylic monomers.
3. The polymerization reaction mixture of aspects 2 and 3, wherein said (meth)acrylic monomers comprise at least 51 percent by weight of methyl methacrylate monomer, and from 0 to 49 weight percent of $C_{1-8}$ alkyl acrylates.
4. The polymerization reaction mixture of any of aspects 1 to 3, wherein said aliphatic primary or secondary amines include one or more amines selected from the group consisting of 1-butylamine. 2-butylamine. 1-, 2-, and 3-pentylamine. 1-, 2-, and 3-hexylamine. 1-, 2-, 3-, and 4-heptylamine. 1-, 2-, 3-, and 4-octylamine, aniline, o-, m-, and p-toluidine, ethylenediamine. 1,2- and 1,3-propylenediamine. 1-2, 1-3, and 1,4-butylenediamine, 1,2-, 1,3-, 1,4- and 1,5-pentylenediamine, o-phenylenediamine. m-phenylenediamine. p-pheylenediamine, ethanolamine, propanolamine, N,N-diethylamine N,N-dibutylamine. N,N-ethyl isopropylamine, N-ethyl-N-phenylamine, N-ethyl-N-(4-methylphenyl) amine, N,N-dimethyl ethylenediamine, N,N-dimethyl propylenediamine and diethanolamine, and mixtures thereof.
5. The polymerization reaction mixture of aspect 3, wherein said amines comprise diethanolamine.
6. The polymerization reaction mixture of any of aspects 1 to 5, wherein said reaction mixture is a syrup further comprising 1 to 80, and preferably 10 to 60 weight percent of (meth)acrylic polymer, based on the total weight of the reaction mixture.
7. The polymerization reaction mixture of aspect 6, wherein said (meth)acrylic polymer comprises polymethyl methacrylate.
8. The polymerization reaction mixture of any of aspects 1-7, wherein said reaction mixture further comprises up to 20, preferably up to 10, and more preferably up to 5 weight percent, based on the total weight of monomer, of one or more additional air void control substances selected from the group consisting of glycols, diols, chain transfer agents, and aliphatic short chain fatty esters.
9. A thermoplastic article comprising:
   a) a (meth)acrylic polymer matrix, and
   b) from 10 to 5000 ppm of aliphatic amine, based on the eight of the polymer,
   wherein said article contains air voids less than 10 volume percent, preferably less than 5 volume percent, more preferably less than 1 volume percent, and most preferably less than 0.1 volume percent.
10. The thermoplastic article of aspect 9, wherein said thermoplastic article her comprises one or more other exotherm control additives at a level of from 0.6 to 20, preferably up to 10, and more preferably up to 5 weight percent, based on the weight of carbonyl-containing monomer, selected from the group consisting of diols, glycols, chain transfer agents, aliphatic short-chain esters.
11. The thermoplastic article of any of aspects 9 and 10, wherein said article further comprises from 20 to 90 weight percent, preferably from 40 to 80 weight percent, and most preferably from 60 to 70 weight percent, of fibres.
12. A process for producing a low defect poly(meth)acrylate article comprising the step of adding to a reaction mixture, from 200 to 5000 ppm, preferably 300 to 4000 ppm, more preferably 400 to 3000 ppm, and most preferably from 600 to 2500 ppm, of one or more primary or secondary aliphatic amines.

EXAMPLES

Example 1

Figure 2:
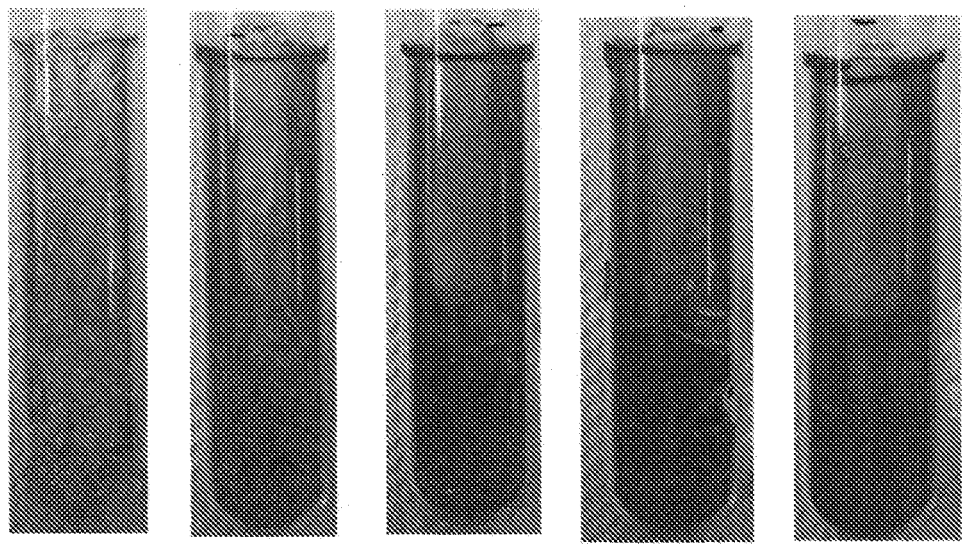
FIG. 2: Demonstrates the effect of varying levels of diethanolamine on the appearance of cured resin of neat MMA syrup polymerization in a test tube.

25 g of an MMA syrup containing PMMA dissolved in MMA monomer was initially mixed in a plastic cup with 3 g of BPO peroxide initiator (AFR40) and variable amounts of amine, and the mixture was then transferred into a test tube. A thermocouple was inserted in the center of the tube and secured by a rubber stopper. The assembly was then placed in an oil bath with a fixed temperature of 27 C. Exotherm (time/temperature) curves were then generated for each amine amount and compared with the control (no additive). Peak exotherm, temperature was considered the highest temperature in the exotherm plot, and the corresponding time (in minutes) was considered the peak exotherm time. The exotherm data for diethanol amine is shown in FIG. 1. Pictures of the test tubes showing air voids with different levels of ethanol amine is shown in FIG. 2.

Quantitative Air Void Assessment Method:

The cured neat resins in the test tubes were pictured by a high resolution camera to generate digital photographs of test tubes. A method was devised with a drawing tool in IGOR PRO7 to calculate the area covered by bubbles in the digital photographs [as an indicator of the true total volume occupied by the air voids. Issues with run-to-run reproducibility of the control (no additive) experiments combined with data analysis uncertainty [estimated±10% error bars for void quantification] make the void assessment using the optical analysis technique most useful for extracting trends in additive effects. Preliminary analysis of the available data indicates that the calculated void volumes were found to track well with qualitative (visual) assessment, with void volume generally decreasing with increasing loading of additive.

The air void level for different amines at different loading levels is shown in FIG. 3.

TABLE I

Effect of variable amounts of representative amine examples on peak exotherm temperature and air voids elimination in neat MMA syrup polymerization in a test tube.

| Additive | Amount (ppm) | Area (%) of Air Voids | Peak Exotherm Temp (° C.) | Peak Exotherm Time (min) |
|---|---|---|---|---|
| No Additive (control) | 0 | 44 | 113 | 38 |
| Diethanolamine | 100 | 25 | 113 | 39 |
| | 600 | 8 | 112 | 39 |
| | 2500 | 2 | 110 | 42 |
| Ethanolamine | 100 | 32 | 112 | 41 |
| | 600 | 12 | 110 | 51 |
| | 1000 | 0.3 | 115 | 67 |
| Ethylenediamine | 100 | 22 | 113 | 41 |
| | 600 | 0 | 116 | 65 |
| | 1000 | 0.2 | 106 | 109 |
| N,N-dimethyl ethylenediamine | 100 | 32 | 109 | 42 |
| | 600 | 6 | 109 | 68 |

What is claimed is:

1. A process for producing a low defect fiber-reinforced poly(meth)acrylate composite article comprising the step of adding to a reaction composition comprising a liquid (meth)acrylic syrup, from 200 to 5000 ppm of one or more primary or secondary aliphatic amines, wherein said low defect article contains less than 10 volume percent of air voids, wherein said (meth)acrylic syrup comprises methyl methacrylate monomer and from 1 to 80 weight percent of (meth)acrylic polymer dissolved in said (meth)acrylic monomer, based on the reaction composition, and; wherein the dynamic viscosity value of the liquid (meth)acrylic syrup is between 10 mPa·s and 10,000 mPa·s.

2. The process of claim 1, wherein said aliphatic primary or secondary amines include one or more amines selected from the group consisting of 1-butylamine, 2-butylamine, 1-, 2-, and 3-pentylamine, 1-, 2-, and 3-hexylamine, 1-, 2-, 3-, and 4-heptylamine, 1-, 2-, 3-, and 4-octylamine, aniline, o-, m-, and p-toluidine, ethylenediamine, 1,2- and 1,3-propylenediamine, 1-2, 1-3, and 1,4-butylenediamine, 1,2-, 1,3-, 1,4- and 1,5-pentylenediamine, ethanolamine, propanolamine, N,N-diethylamine, N,N-dibutylamine, N,N-ethyl isopropylamine, N,N-dimethyl ethylenediamine, N,N-dimethyl propylenediamine and diethanolamine, and mixtures thereof.

3. The polymerization reaction mixture of claim 2, wherein said amines comprise diethanolamine.

4. A fiber-reinforced thermoplastic composite article comprising:

a) a (meth)acrylic polymer matrix, and b) from 10 to 5000 ppm of aliphatic amine as an exotherm control additive, based on the weight of the polymer, c) from 20 to 90 weight percent of fibers wherein said article contains less than 10 volume percent of air voids.

5. The thermoplastic article of claim 4, wherein said thermoplastic article further comprises one or more other exotherm control additives at a level of from 0.6 to 20, based on the weight of carbonyl-containing monomer, selected from the group consisting of diols, glycols, chain transfer agents, aliphatic short-chain esters, having a carbon length of $C_{6-20}$.

* * * * *